US012013950B2

(12) United States Patent
Jurzak et al.

(10) Patent No.: US 12,013,950 B2
(45) Date of Patent: Jun. 18, 2024

(54) METHODS AND APPARATUS FOR DETECTING MALICIOUS RE-TRAINING OF AN ANOMALY DETECTION SYSTEM

(71) Applicant: Motorola Solutions, Inc., Chicago, IL (US)

(72) Inventors: Pawel Jurzak, Cracow (PL); Grzegorz Kaplita, Rzeszow (PL); Wojciech Kucharski, Rzeszow (PL); Stefan Koprowski, Myslenice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 267 days.

(21) Appl. No.: 17/781,955

(22) PCT Filed: Dec. 31, 2019

(86) PCT No.: PCT/PL2019/050083
§ 371 (c)(1),
(2) Date: Jun. 2, 2022

(87) PCT Pub. No.: WO2021/137706
PCT Pub. Date: Jul. 8, 2021

(65) Prior Publication Data
US 2023/0004654 A1 Jan. 5, 2023

(51) Int. Cl.
*H04L 29/06* (2006.01)
*G06F 21/00* (2013.01)
(Continued)

(52) U.S. Cl.
CPC .......... *G06F 21/577* (2013.01); *G06F 21/552* (2013.01); *G06F 2221/033* (2013.01)

(58) Field of Classification Search
None
See application file for complete search history.

(56) References Cited

U.S. PATENT DOCUMENTS 10,824,721 B2 * 11/2020 Kesarwani ............. G06N 20/00
2018/0375885 A1 * 12/2018 Chen ........................ G06N 5/01
(Continued)

FOREIGN PATENT DOCUMENTS

WO 2019/014487 A1 1/2019

OTHER PUBLICATIONS

International Search Report and Written Opinion for International application No. PCT/PL2019/050083; Mailing Date: Sep. 7, 2020, 10 pages.

(Continued)

*Primary Examiner* — Lisa C Lewis

(57) ABSTRACT

An analysis engine of an anomaly detection system receives an input captured by a monitoring device, determines, based on a currently used anomaly detection model, that the input represents an object or event that should not be classified as an anomaly, and determines, based on a previously used model, that the input was previously classified as an anomaly. In response, the analysis engine determines a respective classification result for the input based on additional models used between the currently and previously used models, determines, based on the respective classification results, that it is likely that the anomaly detection system has been deliberately re-trained to falsely classify the input, and initiates an action to correctly classify the input as representing an object or event that should be classified as an anomaly. The anomaly detection models and classification results may be stored in a training repository for the anomaly detection system.

20 Claims, 5 Drawing Sheets

(51) Int. Cl.
    *G06F 21/55*    (2013.01)
    *G06F 21/57*    (2013.01)

(56) References Cited

U.S. PATENT DOCUMENTS

| | | | | |
|---|---|---|---|---|
| 2019/0258953 | A1* | 8/2019 | Lang | G06N 3/08 |
| 2020/0050945 | A1* | 2/2020 | Chen | G06F 18/214 |
| 2020/0082097 | A1* | 3/2020 | Poliakov | G06F 21/577 |
| 2020/0314128 | A1* | 10/2020 | Hild | H04L 63/1416 |
| 2020/0372339 | A1* | 11/2020 | Che | H03M 7/3059 |
| 2020/0410335 | A1* | 12/2020 | Gu | G06V 10/776 |
| 2021/0067549 | A1* | 3/2021 | Chen | G06N 3/084 |
| 2024/0119260 | A1* | 4/2024 | Wang | G06N 3/045 |

OTHER PUBLICATIONS

Jamie Hayes et al., "Learning Universal Adversarial Perturbations with Generative Models", Arxiv.org, Cornell University Ithaca, NY, Aug. 17, 2017.
International Bureau, International Preliminary Report On Patentability, International Application No. PCT/PL2019/050083, Mailed Jul. 14, 2022, 8 Pages.

\* cited by examiner

METHODS AND APPARATUS FOR DETECTING MALICIOUS RE-TRAINING OF AN ANOMALY DETECTION SYSTEM

CROSS-REFERENCE TO RELATED APPLICATIONS

The present application is a U.S. National Stage Application of International Application No. PCT/PL2019/050083 filed Dec. 31, 2019, which is incorporated herein by reference in its entirety.

BACKGROUND OF THE INVENTION

Security systems of all types, including in public safety applications, are increasingly utilizing machine learning approaches to automatically identify unusual scenarios, sometimes referred to as anomalies, and to trigger alerts based on their identification. In one example, machine learning systems can identify anomalies and trigger alerts based on inputs from audio or video monitoring systems along streets or in smart buildings when they detect unusual behavior by people in a specific area, an unusual number of people in specific area, unusual sounds, or other unusual scenarios. In another example, machine learning systems can be used to identify an unusual rate of firewall logs by host and by severity, and to generate warning messages, informational messages, or error messages, as appropriate. These messages may be used to alert a server owner or administration about a potential attack. In some security systems, an alert is generated when an anomaly score determined by the system for a particular scenario exceeds a pre-defined threshold value.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
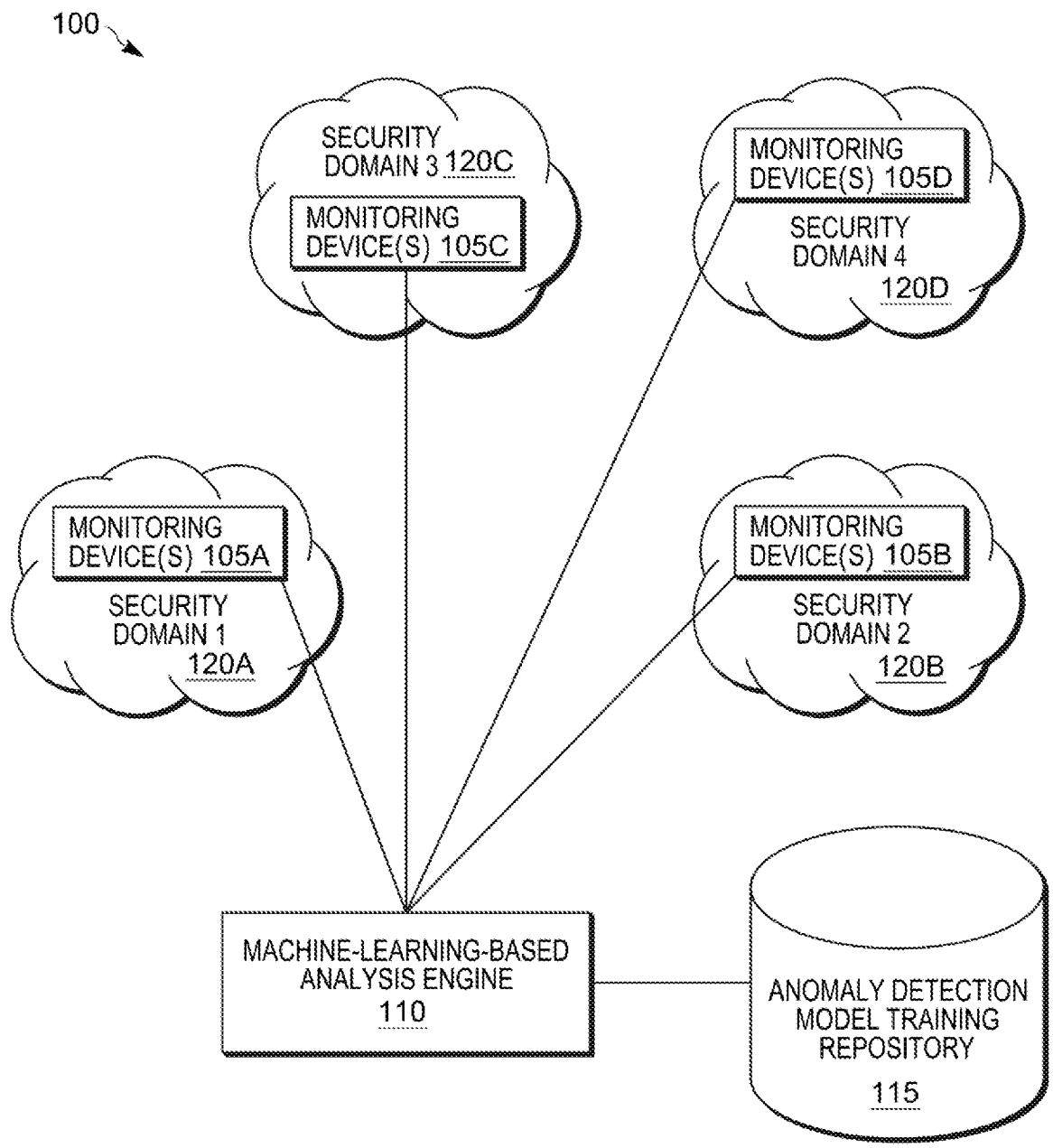
FIG. 1 is a block diagram illustrating selected elements of an example anomaly detection system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and apparatus for detecting malicious re-training of an anomaly detection system. In one embodiment, a disclosed method for detecting malicious re-training of an anomaly detection system includes receiving, by a machine-learning-based analysis engine of the anomaly detection system, an input captured by a monitoring device, determining, by the analysis engine and based on a first anomaly detection model used by the analysis engine at a current point in time, that the input represents an object or event that should not be classified as an anomaly, and determining, by the analysis engine and based on a second anomaly detection model used by the analysis engine at a predetermined previous point in time, that the input represents an object or event previously classified as an anomaly. The method also includes, in response to determining that the input represents an object or event previously classified as an anomaly, determining, by the analysis engine, a respective classification result for the input based on each of one or more additional anomaly detection models used by the analysis engine at respective points in time between the current point in time and the predetermined previous point in time, determining, by the analysis engine and dependent on the respective classification results, that it is likely that the anomaly detection system has been deliberately re-trained to falsely classify the input as representing an object or event that should not be classified as an anomaly, and in response to determining that it is likely that the anomaly detection system has been deliberately re-trained to falsely classify the input as representing an object or event that should not be classified as an anomaly, initiating, by the analysis engine, an action to correctly classify the input as representing an object or event that should be classified as an anomaly.

In one embodiment, a disclosed machine-learning-based analysis engine of an anomaly detection system includes a processor, and a memory storing program instructions. When executed by the processor, the program instructions cause the processor to perform receiving an input captured by a monitoring device, determining, based on a first anomaly detection model used by the analysis engine at a current point in time, that the input represents an object or event that should not be classified as an anomaly, and determining, based on a second anomaly detection model used by the analysis engine at a predetermined previous point in time, that the input represents an object or event previously classified as an anomaly. The program instructions further case the processor to perform, in response to determining that the input represents an object or event previously classified as an anomaly, determining a respective classification result for the input based on each of one or more additional anomaly detection models used by the analysis engine at respective points in time between the current point in time and the predetermined previous point in time, determining, dependent on the respective classification results, that it is likely that the anomaly detection system has been deliberately re-trained to falsely classify the input as representing an object or event that should not be classified as an anomaly, and in response to determining that it is likely that the anomaly detection system has been deliberately re-trained to falsely classify the input as representing an object or event that should not be classified as an anomaly, initiating an action to correctly classify the input as representing an object or event that should be classified as an anomaly.

In one embodiment, a disclosed anomaly detection system includes a first monitoring device, a repository storing a plurality of anomaly detection models, and a machine-learning-based analysis engine. The machine-learning-based analysis engine includes an interface through which the machine-learning-based analysis engine receives inputs from the first monitoring device, a processor, and a memory storing program instructions. When executed by the processor, the program instructions cause the processor to perform receiving, via the interface, a first input captured by the first monitoring device, determining, based on a first anomaly detection model of the plurality of anomaly detection models, that the first input represents an object or event that should not be classified as an anomaly, the first anomaly detection model being used by the analysis engine at a current point in time, and determining, based on a second anomaly detection model of the plurality of anomaly detection models, that the first input represents an object or event previously classified as an anomaly, the second anomaly detection model having been used by the analysis engine at a predetermined previous point in time. The program instructions further cause the processor to perform, in response to determining that the first input represents an object or event previously classified as an anomaly, determining a respective classification result for the first input based on each of one or more additional anomaly detection models of the plurality of anomaly detection models, the one or more additional models having been used by the analysis engine at respective points in time between the current point in time and the predetermined previous point in time, determining, dependent on the respective classification results, that it is likely that the anomaly detection system has been deliberately re-trained to falsely classify the first input as representing an object or event that should not be classified as an anomaly, and in response to determining that it is likely that the anomaly detection system has been deliberately re-trained to falsely classify the first input as representing an object or event that should not be classified as an anomaly, initiating an action to correctly classify the first input as representing an object or event that should be classified as an anomaly.

In any of the disclosed embodiments, the input may include audio data or video data captured by a monitoring device of an intrusion detection system, a private security monitoring system, or a public safety monitoring system. In any of the disclosed embodiments, the object or event may be associated with a public safety incident. In any of the disclosed embodiments, the monitoring device may include an audio capture device, an image capture device, or a video capture device of an intrusion detection system, a private security monitoring system, or a public safety monitoring system.

In any of the disclosed embodiments, the method may further include storing, prior to receiving the input, the first anomaly detection model, the second anomaly detection model, the one or more additional anomaly detection models, and classification results including a classification result for the input based on the second anomaly detection model and the respective classification result for the input based on each of the one or more additional anomaly detection models. Determining the respective classification result for the input based on each of one or more additional anomaly detection models may include accessing the stored classification results.

In any of the disclosed embodiments, taking corrective action may include at least one of outputting a notification of a potentially malicious re-training of the anomaly detection system, triggering an alert indicating that the input represents an object or event that is classified as an anomaly, modifying a parameter of the analysis engine, and modifying a parameter of the first anomaly detection model to generate a third anomaly detection model to be used by the analysis engine at a future point in time.

In any of the disclosed embodiments, the one or more additional anomaly detection models may represent respective snapshots of anomaly detection models used by the analysis engine taken between the current point in time and the predetermined previous point in time, each snapshot being taken at a predetermined time interval or in response to a change in the anomaly detection model used by the analysis engine based on machine learning.

In any of the disclosed embodiments, the method may further include assigning, by the analysis engine, a point value to the input indicative of the likelihood that the input represents an object or event that should be classified as an anomaly, the point value being dependent on which anomaly detection model is used by the analysis engine. Determining that the input represents an object or event that should not be classified as an anomaly may include determining that an assigned point value is less than a threshold point value for classifying the input as representing an object or event that should be classified as an anomaly. Determining that the input represents an object or event that should be classified as an anomaly may include determining that an assigned point value is greater than or equal to a threshold point value for classifying the input as representing an object or event that should be classified as an anomaly. Determining that it is likely that the anomaly detection system has been deliberately re-trained to falsely classify the input as representing an object or event that should not be classified as an anomaly may include detecting a pattern of point values or a trend in point values assigned to the input based on each of the one or more additional anomaly detection models that is inconsistent with expected patterns or trends associated with machine learning by the analysis engine.

In any of the disclosed embodiments, determining that it is likely that the anomaly detection system has been deliberately re-trained to falsely classify the input as representing an object or event that should not be classified as an anomaly may include determining a respective classification result for the input based on each of one or more anomaly detection models used by an analysis engine of another anomaly detection system at respective points in time.

In any of the disclosed embodiments, the repository may further store classification results including a classification result for the input based on the second anomaly detection model and the respective classification result for the input based on each of the one or more additional anomaly detection models and determining the respective classification result for the input based on each of one or more additional anomaly detection models may include accessing the stored classification results.

In any of the disclosed embodiments, the anomaly detection system may further include a second monitoring device located in a security domain other than a security domain in which the first monitoring device is located and determining that it is likely that the anomaly detection system has been deliberately re-trained to falsely classify the first input as representing an object or event that should not be classified as an anomaly may include determining a respective classification result for a second input captured by the second monitoring device based on each of one or more anomaly detection models used by the analysis engine at respective points in time.

As noted above, security systems are increasingly utilizing machine learning techniques for automatically identifying anomalies and triggering corresponding alerts. These may include public safety monitoring systems, private security monitoring systems, intrusion detection systems, network or server protections systems, public safety emergency call center systems, and other types of security systems. In some cases, a malicious offender may be aware of machine learning or other artificial intelligence modules in a security system and, as a part of a planned attack, may influence these modules in a way that an anomaly will not be correctly identified, and no alert will be triggered in response to the attack. More specifically, a malicious offender may re-train an anomaly detection system by deliberately causing a change to a threshold value at which an alert is triggered for a particular scenario. For example, the offender may, through multiple engagements with the system, incrementally push the threshold higher until the anomaly detection system learns to ignore the particular scenario, rather than identifying it as an anomaly and triggering an alert. In this example, because the system is machine-learning-based, it responds to the incrementally different scenarios presented to the system by the malicious offender and extends the range of values that are considered valid. Eventually, an unusual scenario that would otherwise have been treated as an anomaly will be treated as typical.

For example, in some embodiments, an anomaly detection system that implements unsupervised machine learning may classify a scenario as typical (i.e., not an anomaly) when a classification score for the scenario is below the threshold value at which an alert is triggered. The threshold value may, e.g., periodically, be set to the average of the classification scores observed over some time period. By taking actions to cause the classification score to increase over time, a malicious offender may push the threshold value at which an alert is triggered and re-train the system to falsely classify a scenario as typical that should instead be classified as an anomaly.

In one example, an anomaly detection system that triggers an alert when monitored doors are left open longer than a threshold time value may, periodically, set the threshold time period to the average of the amount of time that various monitored doors were left open during the last two days with an added 50% margin. A user may, in a first instance, hold a monitored door open for five seconds. Another user may hold the door, or another monitored door, open for seven seconds.

The anomaly detection system may then assume that holding doors open for up to $(avg(5, 7)) \times 1.5 = 9$ seconds does not represent an anomaly. In this example, the threshold time value can be pushed with every door opening in that when a malicious offender holds a door open for eight seconds, it may cause the threshold time value to be pushed to $(avg(8, 7)) \times 1.5 = 11$ seconds. In this example, when the malicious offender holds a door open for ten seconds, what should have been recognized as an anomaly will not be detected.

In other examples, an anomaly detection system may measure the number of visits on a web page per hour, the number of people in a garden, or the amount of time that a dog barks and periodically reset the threshold value at which an alert is triggered, which may allow a malicious offender to re-train the anomaly detection system to ignore a scenario that should have triggered an alert. In one example, a malicious offender may increase the load on a server each day so that the services implemented on the server perform slower and slower. In another example, a malicious offender may try to access more and more accounts, pushing the limit for accesses from a specific network location or IP address. In yet another example, a malicious offender may download more and more data from a server, pushing the limit on the amount of data that can be downloaded. In these and other examples, the anomaly detection system may use various sensors as well as video or audio analytics to perform measurements and set, or re-set, the threshold values. For example, in some embodiments, an anomaly detection system may perform an IP flow analysis in which data transfer rates are measured for different IP addresses, clients, countries of origin, or times of day to identify potential anomalies. Similar methods may be used to maliciously re-train an anomaly detection system that implements supervised machine learning, the difference being that the system may require user input, or another type of confirmation indicating that the classification of a scenario as an anomaly is correct. If the classification result is not confirmed, the threshold value may be pushed.

In various embodiments, the methods and apparatus described herein may be able to detect the malicious re-training of an anomaly detection system by an offender who gradually teaches a machine-learning-based analysis engine of the system to falsely recognize an unusual scenario as a typical one. For example, the machine-learning-based analysis engines described herein may be able to determine whether a new threshold has been manipulated to ignore certain scenarios that should have triggered alerts, thus preventing the anomaly detection system from generating false negative classifications.

In at least some embodiments of the anomaly detection systems described herein, a training repository may maintain snapshots of anomaly detection models used over time for the detection of anomaly scenarios in received inputs, such as in audio and/or video inputs, log data, or another type of textual input that is captured by monitoring devices associated with the system. For example, the received inputs may be or include log data representing network traffic, log file entries, user activities or other types of activities or events. A machine-learning-based analysis engine may continuously or periodically apply previously used anomaly detection models to currently received inputs. In some embodiments, the machine-learning-based analysis engine may apply anomaly detection models used by different clients managed by a single anomaly detection system including, in some cases, anomaly detection models used by different tenants in a multitenant anomaly detection system. When a previously used anomaly detection model identifies a particular scenario as an anomaly, but the currently used anomaly detection model does not, the analysis engine may perform a secondary determination, via an analysis of intermediate anomaly detection model snapshots taken between those of the previously used anomaly detection model and the currently used anomaly detection model, to determine whether the anomaly detection model has been intentionally and maliciously re-trained. If the analysis indicates that it is likely that a malicious re-training has taken place, actions may be taken to correctly classify the scenario as an anomaly and to trigger one or more alerts.

In at least some embodiments, the techniques described herein for detecting malicious re-training of an anomaly detection system may be applied in systems that implement anomaly detection using unsupervised machine learning. In other embodiments, these techniques may be applied in anomaly detection systems that employ supervised machine learning or other artificial intelligence techniques. For example, unsupervised anomaly detection techniques may operate under an assumption that the majority of instances of a detected event or object, such as a behavior of a person detected in captured video, a person, vehicle, weapon, or other property or object of value or interest detected in captured video, a sequence of interactions between persons or between a person and vehicle, weapon, or other property or object of value or interest detected in captured video, a particular sound or sequence of sounds detected in an audio recording, a particular measurement or pattern of measurements detected in data captured by a sensor, or a particular log entry or sequence of log entries captured by a server or network monitoring device, in an unlabeled data set should not be classified as anomalies and may classify as anomalies those instances that appear to be outliers compared to the majority of the instances. Supervised anomaly detection techniques typically involve training a classifier, which may involve labeling elements of a training data set as representing an anomaly or as representing a normal or typical event or object. Machine learning techniques that may be used in the anomaly detection systems described herein may include, but are not limited to, Linear Regression techniques, Logistic Regression techniques, Decision Trees, SVM, Naive Bayes techniques, k-nearest neighbor techniques, K-Means clustering, Random Decision Forest techniques, Dimensionality Reduction Algorithms, various Gradient Boosting algorithms, such as Gradient Boosting Machine techniques, Extreme Gradient Boosting algorithms, Light Gradient Boosting Machine algorithms, or Gradient Boosting algorithms with categorical features, Apriori algorithms, Markov Decision Processes, and various neural networks, such Feedforward Neural Networks, Artificial Neuron Models, Radial Basis Function Neural Networks, Multilayer Perceptron networks, Convolutional Neural Networks, Deep Convolutional Neural Networks, Deconvolutional Neural Networks, Deep Convolutional Inverse Graphics Networks, Generative Adversarial Networks, Recurrent Neural Networks, Long/Short Term Memory techniques, Modular Neural Networks, Sequence-To-Sequence Models, Liquid State Machines, Extreme Learning Machines, Deep Residual Networks, Kohonen Networks, Support Vector Machines, or Neural Turing Machines.

Referring now to FIG. 1, there is provided a block diagram illustrating selected elements an example anomaly detection system 100, in accordance with some embodiments. In the illustrated example, anomaly detection system 100 includes a machine-learning-based analysis engine 110, an anomaly detection model training repository 115, and a plurality of monitoring devices 105 located in various security domains 120. In some embodiments, machine-learning-based analysis engine 110 may be a standalone electronic computing device communicatively coupled to the plurality of monitoring devices 105 via a local wired or wireless communication interface. In other embodiments, machine-learning-based analysis engine 110 may be, or may be a component of, a remote or cloud-based electronic computing device or server communicatively coupled to the plurality of monitoring devices 105 over a network. In still other embodiments, machine-learning-based analysis engine 110 may be co-located with, or may be a component of, a monitoring device 105 in a particular security domain 120. The anomaly detection model training repository 115 may store machine-learning models used by machine-learning-based analysis engine 110 in performing anomaly detection, referred to herein as anomaly detection models, at various points in time. In some embodiments, the plurality of monitoring devices 105 may include an audio capture device, an image capture device, a video capture device or a sensor (such as a movement sensor, an intelligent lock, or another Internet-of-Things device) of an intrusion detection system, a private security monitoring system, or a public safety monitoring system. In other embodiments, the plurality of monitoring devices 105 may include electrical, mechanical, or environmental sensors or other measuring devices for capturing the state of the environment in which they are deployed, or the state of a computing device, such as a server, or a network.

In some embodiments, each of the multiple security domains 120 may represent a respective facility for which the anomaly detection system 100 provides anomaly detection as part of a security service, a respective area within such a facility, an installment of monitoring devices for a respective security system customer, a collection of monitoring devices of the same type, or any other collection of monitoring devices that provide inputs to machine-learning-based analysis engine 110. In the illustrated example, one or more monitoring devices 105a are located in security domain 1 (120a), one or more monitoring devices 105b are located in security domain 2 (120b), one or more monitoring devices 105c are located in security domain 3 (120c), and one or more monitoring devices 105d are located in security domain 4 (120d). In some embodiments, all of the monitoring devices 105 located in the same security domain may be monitoring devices of the same type. In other embodiments, the monitoring devices 105 located in a single security domain may include monitoring devices of two or more types.

In the illustrated embodiment, machine-learning-based analysis engine 110 may receive inputs from various ones of the monitoring devices 105 over one or more communications networks. In various embodiments, the communications networks may, for example, include a fourth-generation broadband wireless technology (4G) network, a land mobile radio (LMR) network, a long-term evolution wireless technology (LTE) network, a Wi-Fi network, a fifth-generation broadband wireless technology (5G) network (including a network architecture compliant with, for example, the 3GPP TS 23 specification series and a new radio (NR) air interface compliant with the 3GPP TS 38 specification series), or any other suitable communications network. In some public safety applications, the communications network may be a high-powered land mobile radio (LMR) network or a public safety long-term evolution (PS LTE) network.

In at least some embodiments, machine-learning-based analysis engine 110 may, based on a currently used anomaly detection model and at least one previously used anomaly detection model, determine a classification result for each input it receives, identifying the input as representing an object or event that should be classified as an anomaly or as an object or event that should not be classified as an anomaly but should be considered typical for its input type. The machine-learning-based analysis engine 110 may output data representing the classification result or store data representing the classification result, e.g., in anomaly detection model training repository 115, for further use. In at least some embodiments, machine-learning-based analysis engine 110 may, either in real time or as a post-process, perform an audit of the anomaly detection system 100 to determine whether the system has been maliciously re-trained. For example, based on the currently used anomaly detection model, at least one previously used anomaly detection model, and the classification results determined by those models for one or more inputs, machine-learning-based analysis engine 110 may determine that anomaly detection system 100 has been maliciously re-trained to falsely classify a particular input as representing an object or event that should not be classified as an anomaly. In some embodiments, the audit may include comparing classification results for the same or similar inputs determined in multiple security domains over time.

Note that while anomaly detection system 100 illustrated in FIG. 1 includes a single machine-learning-based analysis engine 110, in other embodiments, an anomaly detection system may include more than one machine-learning-based analysis engine 110. For example, in some embodiments, a respective machine-learning-based analysis engine 110 may be co-located or associated with each security domain 120. In other embodiments, a redundant machine-learning-based analysis engine may be located in a different geographic location than machine-learning-based analysis engine 110 and may provide failover capability in the case that machine-learning-based analysis engine 110 is damaged during a severe weather event, natural disaster or other public safety emergency, or is otherwise unable to function correctly or reliably in anomaly detection system 100.

In some embodiments, only information associated with monitoring devices 105 that are located in the same security domain 120, such as audio inputs, video inputs, or inputs from various electrical, mechanical, or environmental sensors, or log data captured by the monitoring devices 105, as well as corresponding classification results, may be stored in an anomaly detection model training repository 115 communicatively coupled to a particular machine-learning-based analysis engine 110. In other embodiments, information associated with monitoring devices 105 that are located multiple security domains 120 may be stored in an anomaly detection model training repository 115 communicatively coupled to a particular machine-learning-based analysis engine 110. In some embodiments, multiple anomaly detection model training repositories 115 may be communicatively coupled to a particular machine-learning-based analysis engine 110, each of which stores information associated with monitoring devices 105 located in one or more security domains 120. In some embodiments, a single anomaly detection model training repository 115 may be communicatively coupled to multiple machine-learning-based analysis engines 110.

Figure 2:
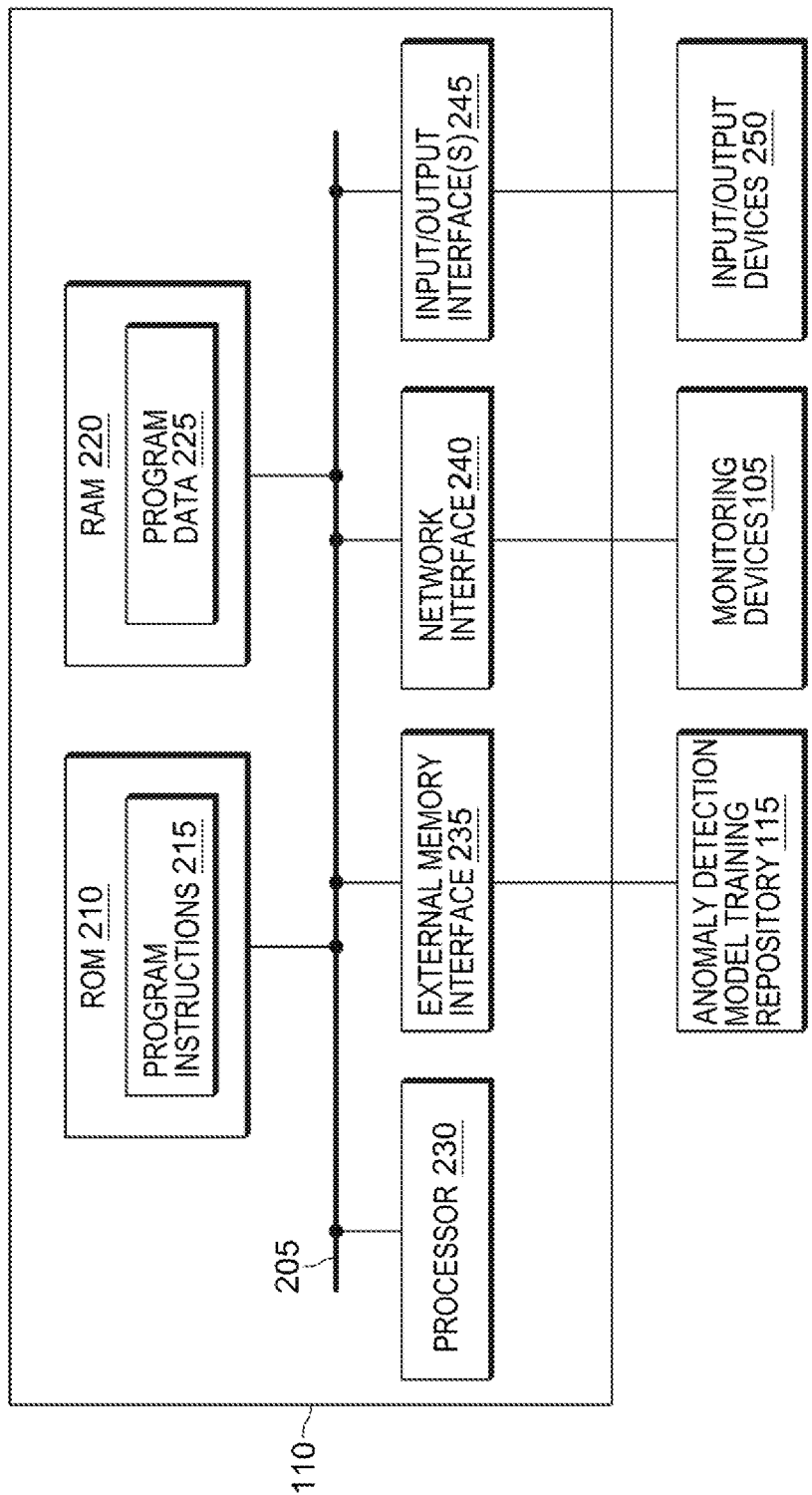
FIG. 2 is a block diagram illustrating selected elements of a machine-learning-based analysis engine of an anomaly detection system, in accordance with some embodiments.

FIG. 2 is a block diagram illustrating selected elements of a machine-learning-based analysis engine 110 of an anomaly detection system, in accordance with some embodiments. In the illustrated example, machine-learning-based analysis engine 110 includes a Read Only Memory (ROM) 210, a Random Access Memory (RAM) 220, an electronic processor 230, one or more input/output device interfaces 245 for communicating with locally attached input/output devices 250, an external memory interface 235 through which machine-learning-based analysis engine 110 may be coupled to an anomaly detection model training repository 115, which may be stored in an external memory, and a network interface 240 through which machine-learning-based analysis engine 110 receives inputs from various monitoring devices 105, all of which are coupled to a system bus 205 through which they communicate with each other. In some embodiments, at least some inputs may be received from particular monitoring devices 105 through one or more wired or wireless input/output interfaces 245. Input/output device interfaces 245 may include one or more analog input interfaces, such as one or more analog-to-digital (A/D) convertors, or digital interfaces for receiving signals or data from, and sending signals or data to, one or more input/output devices 250. For example, input/output device interfaces 245 may include suitable interfaces for receiving audio inputs, video inputs, or inputs from various electrical, mechanical, or environmental sensors, such as a movement sensor, an intelligent lock, or another Internet-of-Things device, or other measuring devices that capture, e.g., as log data, the state of the environment in which they are deployed, or the state of a computing device, such as a server, or a network to which they are coupled, and that may be indicative of an unusual scenario that should be classified as an anomaly.

In various embodiments, an external memory in which anomaly detection model training repository 115 is stored may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, the electronic processor 230 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 210 stores program instructions 215, at least some of which may be executed by the electronic processor 230 to perform the methods described herein. For example, any or all of the operations of method 300 illustrated in FIG. 3, method 400 illustrated in FIG. 4, and method 500 illustrated in FIG. 5 may be performed by program instructions 215 executing on electronic processor 230 of machine-learning-based analysis engine 110. In some embodiments, program instructions 215 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 215 may include program instructions that when executed by electronic processor 230 implement other functionality features of machine-learning-based analysis engine 110.

In this example embodiment, RAM 220 may, from time to time, store program data 225 including, without limitation, information representing an anomaly detection model currently being used by machine-learning-based analysis engine 110 to determine classification results, an input received from a monitoring device 105, a threshold value for identifying an anomaly, an initial classification result for a given input, a final classification result for a given input, and/or other data accessible by program instruction 215 and used in performing the methods described herein. In some embodiments, any or all of this information may be stored in a programmable non-volatile memory, such as in an external memory communicatively coupled to machine-learning-based analysis engine 110 through external memory interface 235. For example, in some embodiments, anomaly detection model training repository 115 may, at various times, store multiple snapshots of anomaly detection models used by machine-learning-based analysis engine 110 to determine classification results and for training of the anomaly detection system, inputs received from various monitoring devices 105, threshold values for identifying anomalies, initial classification results for various inputs, final classification results for various inputs, and/or other data accessible by program instruction 215 and used in performing the methods described herein.

In some embodiments, RAM 220 may also store data used in performing other functions of machine-learning-based analysis engine 110. In some embodiments, RAM 220 may, from time to time, store local copies of all or a portion of program instructions 215 or other program instructions copied from ROM 210. In some embodiments, RAM 220 may, from time to time, store local copies of data copied from anomaly detection model training repository 115 or another external memory over external memory interface 235.

In various embodiments, input/output device interfaces 245 may operate to allow machine-learning-based analysis engine 110 to receive user input, such as commands and other information usable to configure machine-learning-based analysis engine 110 for detecting anomalies based on inputs received from monitoring devices 105, or to initiate an audit of the anomaly detection process, as described in more detail below. User input may be provided, for example, via a keyboard or keypad, soft keys, icons, or soft buttons on a touch screen of a display, a smart speaker or other type of virtual assistant that provides voice input or video input based on voice recognition or gesture recognition, a scroll ball, a mouse, buttons, and the like (not shown in FIG. 2). In some embodiments, input/output device interfaces 245 may include a graphical user interface (GUI) generated, for example, by electronic processor 230 from program instructions 215 and program data 225 and presented on a display, enabling a user to interact with the display. Input/output device interfaces 245 may also include other input mechanisms, which for brevity are not described herein and which may be implemented in hardware, software, or a combination of both.

Network interface 240 may be a suitable system, apparatus, or device operable to serve as an interface between electronic processor 230 and a network. In some embodiments, network interface 240 may enable machine-learning-based analysis engine 110 to communicate with a server or a remote device (not shown in FIG. 2) over a network using a suitable transmission protocol and/or standard, including, but not limited to, transmission protocols and/or standards enumerated below with respect to the discussion of the network. In some embodiments, network interface 240 may be communicatively coupled via a network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof. Network interface 240 may enable wired and/or wireless communications to and/or from monitoring devices 105 or other elements of an anomaly detection system that includes machine-learning-based analysis engine 110.

In various embodiments, machine-learning-based analysis engine 110 may include more, fewer, or different elements than those of machine-learning-based analysis engine 110 illustrated in FIG. 2.

As noted above, malicious offenders may be aware of machine learning or other artificial intelligence modules in an anomaly detection system and, as part of a planned attack, may deliberately and maliciously re-train the anomaly detection system so that an anomaly indicative of the attack will be falsely classified as not representing an anomaly and no alert will be triggered. In one example, if a burglar is planning to enter a property at which there is a dog known to bark when it sees a stranger, they may teach an anomaly detection system, such as an intruder alert system on the property, that it is typical for the dog to bark at 10:00 in the morning without any negative consequences. For example, on a first of multiple days leading up to the planned attack, the burglar, or an associate of the burglar, may approach the property at approximately 10:00 am and remain within sight of the dog as the dog barks for ten seconds. The intruder alert system may capture the sound of the dog barking as an audio input and may classify the audio input as not representing an anomaly based on a default threshold above which an alert is triggered of thirty seconds.

On each of multiple other days, the burglar, or their associate, may approach the property at approximately 10:00 am and remain in sight of the dog for an increasing amount of time, with no negative consequences, eventually passing the default threshold of thirty seconds and continuing to increase the length of time that the dog barks. Since there are never any negative consequences associated with the dog barking at 10:00 am, even as the barking time is slowly increased to two minutes or more, the intruder alert system may be re-trained to ignore an audio input representing the dog barking at 10:00 am for as long as two minutes. The burglar may then enter the property at 10:00 am and may have two minutes to steal items on the property before the intruder alert would trigger an alert, even though the dog may be barking at the burglar the entire time they are on the property.

In this example, the classification score assigned to each barking dog audio input by a machine-learning-based analysis engine of the intruder detection system may correspond to the number of seconds that the dog barks. The initial threshold for triggering an alert may be thirty seconds, corresponding to thirty points. In this case, an anomaly detection model used by the intruder detection system on the first day, and on other days on which the dog barks for less than thirty seconds, may classify the barking dog audio input as typical, rather than as an anomaly that triggers an alert. On the day that the dog barks for thirty seconds, and on multiple other days on which the dog barks for longer than thirty seconds, the anomaly detection model used by the intruder detection system may classify the barking dog audio input as an anomaly that triggers an alert. However, since there are no negative consequences associated with the barking dog on any of these days, the anomaly detection model may gradually increase the threshold number of points above which a barking dog audio input triggers an alert, eventually pushing the threshold past two minutes.

In some embodiments, using the techniques described herein to compare the received audio inputs, the classification scores assigned to each of the received audio inputs, and the classification results for each of the received audio inputs to corresponding audio inputs, scores, and classification results over time, the analysis engine of the intruder detection system may determine that it is likely that the intruder detection system has been deliberately and maliciously re-trained. Corrective action may then be taken to reverse the re-training and, in some cases, modify the intruder detection system to be less susceptible to malicious re-training.

In another example, a malicious offender who plans to bring a prohibited item concealed in a large backpack into a secure facility that includes video monitoring devices may, prior to bringing the prohibited item into the secure facility, train a public security monitoring system to treat the fact that the offender is carrying a large backpack into the facility as typical, rather than as an anomaly to be singled out for additional screening. In this example, on the first day that the offender brings the large backpack into the facility, without the prohibited item, a video input capturing their behavior in carrying a large backpack in which a prohibited item could clearly be concealed into the secure facility, may be assigned a large number of points by a machine-learning-based analysis engine of the anomaly detection system, triggering an alert that causes the offender to be singled out for additional screening. However, the backpack is not associated with any negative consequences, such as a public safety incident involving any prohibited items, as it does not contain any prohibited items at this point. Similarly, on multiple other days, the offender may carry the backpack into the facility and may, each time, be singled out for additional screening. However, since there are never any negative consequences associated with the offender's behavior, the anomaly detection system in the secure facility may gradually decrease the number of points assigned to video inputs depicting the offender carrying the large backpack into the facility or, alternatively, gradually increase the threshold above which this behavior triggers an alert for the particular offender. This may eventually result in re-training the anomaly detection system to classify video inputs depicting this behavior by the particular offender as typical rather than as an anomaly triggering additional screening. Subsequently, the offender may bring the prohibited item into the facility in the large backpack without it being likely that they would be singled out for additional screening.

In some embodiments, using the techniques described herein to compare the received video inputs, the classification scores assigned to each of the received video inputs, and the classification results for each of the received video inputs to corresponding video inputs, scores, and classification results over time, the analysis engine of the anomaly detection system in the secure facility may determine that it is likely that the anomaly detection system has been deliberately and maliciously re-trained. Corrective action may then be taken to reverse the re-training and, in some cases, modify the anomaly detection system to be less susceptible to malicious re-training.

In some cases, a malicious offender may wish to launch an attack on a server or network protected by an anomaly detection system. For example, new generation intrusion detection and prevention security systems may perform analytics continuously on user behavior and may apply adaptive machine learning based on user behavior patterns. A specific branch of such security systems deals with User and Entity Behavior Analytics solutions (UEBA). A typical scenario for a UEBA system may involve detection of compromised user accounts based on the behavioral analytics of a user's historical activities compared to the activity of an attacker in possession of the credentials associated with a legitimate user. The analytics behind UEBA systems may include supervised and unsupervised adaptive learning techniques aimed at dynamically building behavioral models of legitimate users. To detect malicious activity, the UEBA system analytics may, for each user session, continuously calculate a "deviation score" through a comparison of current user behavior and a historical user behavioral model for the user. If the deviation score is below a certain threshold, the current user behavior may be recognized as typical and the UEBA machine learning may adjust the user behavioral model to reflect the minor deviation.

An attacker, knowing that the UEBA analytics are being used to monitor his or her activities, may attempt to influence the user behavioral model by gradually performing minor abusive steps, which may still be scored within the tolerable deviation threshold. In this way, the attacker may maliciously re-train the UEBA analytics, preparing it for a final attack scenario. At some point, the attacker may conduct the attack using the credentials of the legitimate user without being detected by the UEBA analytics. For example, the UEBA system may monitor the working hours of a given user who is to be the victim in this attack scenario. The given user's activities may have been observed every day between the hours of 8 am and 5 pm. Additionally the UEBA system may have monitored the network load generated by the given user's activities, which on average is 100 MB per hour for the given user's workstation. For tactical purposes, the attacker may wish to conduct the attack after working hours, e.g., starting at 6 pm, and may wish to explore the sales department's system database, causing traffic of over 200 MB per hour. The attacker may know that, according to available data breach studies, the average time to detect a data breach is counted in months, so there is time to maliciously re-train the UEBA system before conducting the attack. Each day before the attack, the attacker may log into the system at 5 pm and may progressively lengthen their user session by additional 5 minutes, while at the same time generating higher and higher network loads. Each day, the malicious activities may be within the UEBA system tolerance threshold. After two months, the UEBA user behavioral model may suggest that the given user tends to work overtime. Therefore, the system may not react as long as the given user's activities are detected between 8 am and 9 pm. In addition, the attacker may have taught the system that a load of 200 MB is now inside the tolerable range. At this point, the attacker may conduct the actual attack. In at least some embodiments, the techniques described herein for detecting malicious re-training of an anomaly detection system may prevent this type of attack by detecting that the UEBA analytics have been maliciously trained to ignore the attacker's misbehavior.

In various embodiments, to determine whether a scenario represented by a received input should or should not be classified as an anomaly, the machine-learning-based analysis engines described herein may perform the classification by first using a current machine learning model for detecting anomalies (ML-Current) and a previous machine learning model for detecting anomalies that is a snapshot from the past, (ML-Snapshot). In one example, snapshots of the anomaly detection models used by the analysis engine may be taken and stored in a repository once per day and the snapshot used in the first stage of the classification may be a snapshot taken one month earlier. Scenario S may be evaluated using an anomaly determination function that returns a score and the system is configured such that scenario S is classified as an anomaly when a score associated with this scenario exceeds a predetermined threshold.

When the score returned for scenario S is below the predetermined threshold when applying ML-Current, indicating that scenario S should not be classified as an anomaly, and the score returned for scenario S is below the predetermined threshold when applying ML-Snapshot, indicating that scenario S should be classified as an anomaly or has previously been classified as an anomaly, the system may perform a secondary analysis to determine whether the system was gradually re-trained so that ML-Current does not classify scenario S as an anomaly or to verify that the system correctly modified the threshold value over time in response to valid inputs.

In various embodiments, the secondary analysis and verification may include obtaining scores or anomaly classification results for scenario S when additional machine learning models were applied by the analysis engine between the point in time at which the ML-Current model was applied and the point in time at which the ML-Snapshot was applied by the analysis engine. In some embodiments, these scores or anomaly classification results and the corresponding inputs representing scenario S may be stored in a repository in association with the machine learning model snapshots that produced them. If the pattern or trend of scores and classification results that led the analysis engine to stop classifying scenario S as an anomaly after a certain point in time is inconsistent with expected patterns or trends associated with natural machine learning by the analysis engine based on valid inputs, the analysis engine may re-classify scenario S as an anomaly and trigger an alert indicating a potentially malicious re-training of the anomaly detection system.

Figure 3:
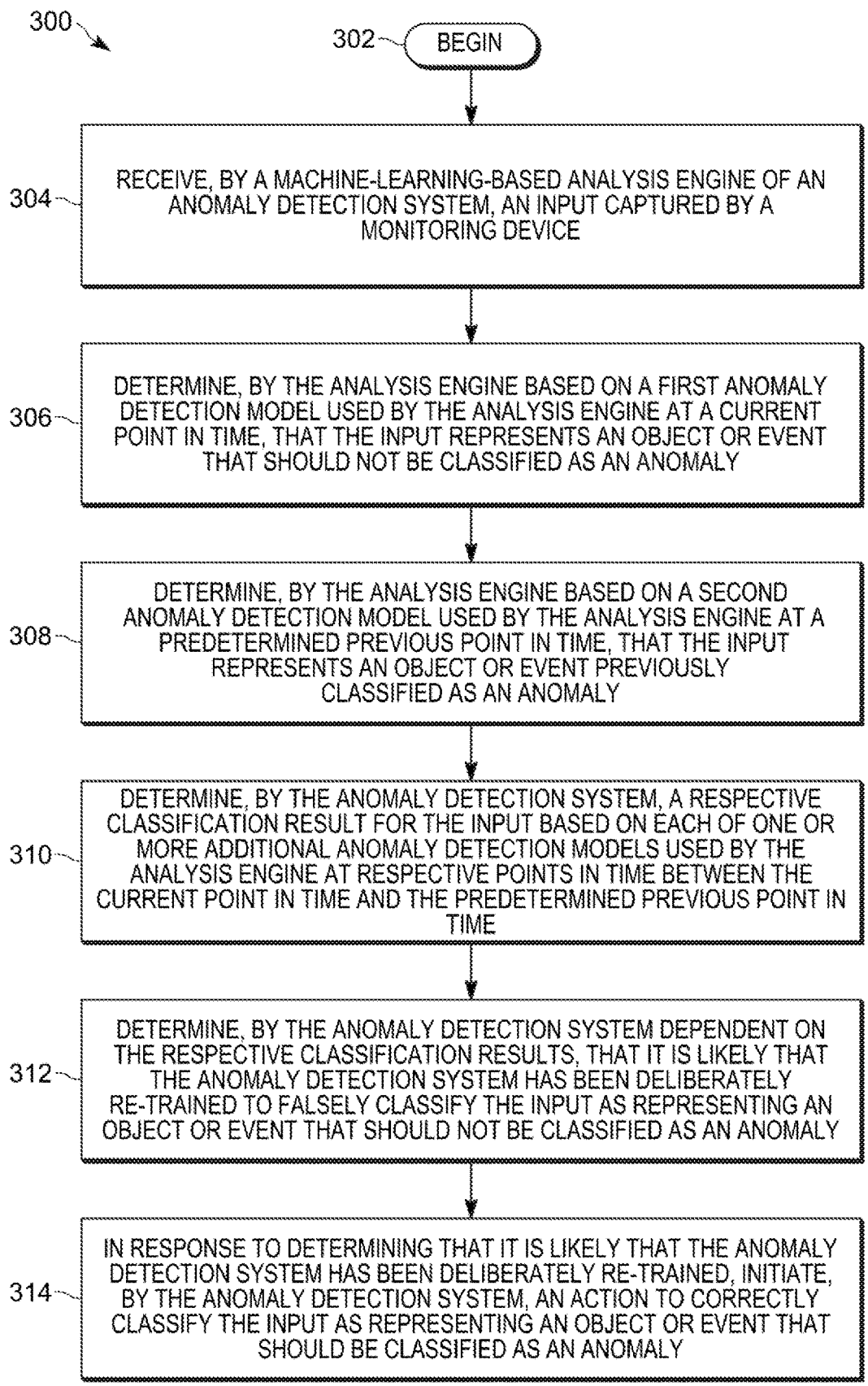
FIG. 3 is a flowchart illustrating selected elements of an example method for detecting malicious re-training of an anomaly detection system, in accordance with some embodiments.

FIG. 3 is a flowchart illustrating selected elements of an example method 300 for detecting malicious re-training of an anomaly detection system, in accordance with some embodiments. In at least some embodiments, some or all of the operations shown in FIG. 3 may be performed by machine-learning-based analysis engine, such as machine-learning-based analysis engine 110 illustrated in FIG. 2. In at least some embodiments, the machine-learning-based analysis engine 110 may include a processor and a memory storing instructions that when executed by the processor cause the processor to perform any of the operations illustrated in FIG. 3. In other embodiments, the machine-learning-based analysis engine 110 may include a hardware state machine or other electronic circuitry configured to perform one or more of the operations illustrated in FIG. 3. While a particular order of operations is indicated in FIG. 3 for illustrative purposes, the timing and ordering of such operations may vary where appropriate without negating the purpose and advantages of the examples set forth in detail throughout the remainder of this disclosure.

In this example embodiment, method 300 begins at block 302 in FIG. 3 and continues at block 304 with receiving, by a machine-learning-based analysis engine of an anomaly detection system, an input captured by a monitoring device. For example, in some embodiments, the monitoring device may be or include an audio capture device, an image capture device, a video capture device, a movement sensor, an intelligent lock, or another Internet-of-Things device of an intrusion detection system, a private security monitoring system, or a public safety monitoring system and the input may be or include audio data, video data, log data, or another type of textual input that is captured by the monitoring device. In other embodiments, the monitoring device may be or include electrical, mechanical, or environmental sensors or other measuring devices for capturing the state of the environment in which they are deployed, or the state of a computing device, such as a server, or a network, and the input may be or include log data, or another type of textual input that is based on sensor readings. For example, the input may be or include log files representing network traffic, log file entries, user activities or other types of activities or events. At 306, the method includes determining, by the analysis engine based on a first anomaly detection model used by the analysis engine at a current point in time, that the input representing an object or event that should not be classified as an anomaly. The input may be evaluated by the analysis engine using an anomaly determination function of the first anomaly detection model. The anomaly determination function of the first anomaly detection model may return a classification score and the analysis engine may classify the input as representing an object or event that should be classified as an anomaly when the classification score returned for the input exceeds a predetermined threshold associated with the first anomaly detection model. The evaluation may include assigning, by the analysis engine, a point value to the input indicative of the likelihood that the input represents an object or event that should be classified as an anomaly, where the point value is dependent on which anomaly detection model is used by the analysis engine. For example, each type of received input may be evaluated using an anomaly detection model that is specific to the input type, to the type of monitoring device from which the input was received, or to the context or environment in which the anomaly detection system operates, and that has an associated threshold value. Therefore, in some embodiments, the analysis engine may assign points differently to objects or events of different types and may determine the threshold values above which the resulting classification scores indicate that an input likely represents an object or event that should be classified as an anomaly differently for objects or events of different types.

At 308, method 300 includes determining, by the analysis engine based on a second anomaly detection model used by the analysis engine at a predetermined previous point in time, that the input represents an object or event previously classified as an anomaly. For example, in various embodiments, snapshots of the anomaly detection models used by the analysis engine over time may be stored in a training repository at predetermined or configurable intervals or when the number or significance of changes made to the anomaly detection model through machine learning, whether malicious or not, trigger a snapshot. The predetermined point in time associated with the second anomaly detection model may correspond to a predetermined time interval prior to the application of the first anomaly detection model to the input, where the predetermined time interval may be a default or configurable time interval based on the context in which the anomaly detection system is deployed, the nature or severity of the object or event represented by the input, the potential impact of a false negative classification, or other criteria. In some embodiments, classification results produced by each snapshot may be stored by the analysis engine in the training repository in association with the snapshot and the analysis engine may obtain a classification result produced by the second anomaly detection model for the input from the training repository. In other embodiments, the analysis engine may produce a classification of the input using the stored second anomaly detection model to determine that receipt of the input would have resulted in a classification as an anomaly in the past. In this case, the input may be evaluated by the analysis engine using an anomaly determination function of the second anomaly detection model. The anomaly determination function of the second anomaly detection model may return a classification score and the analysis engine may classify the input as representing an object or event that should be classified as an anomaly when the classification score returned for the input exceeds a predetermined threshold associated with the second anomaly detection model.

At 310, in response to determining that the input represents an object or event previously classified as an anomaly, the method includes determining, by the anomaly detection system, a respective classification result for the input based on each of one or more additional anomaly detection models used by the analysis engine at respective points in time between the current point in time and the predetermined previous point in time. For example, in some embodiments, the training repository may store the first anomaly detection model, the second anomaly detection model, one or more intermediate anomaly detection models, and respective classification results for the input based on each of the stored anomaly detection models. In such embodiments, the analysis engine may obtain the respective classification result for the input based on each of the intermediate anomaly detection models from the training repository. In other embodiments, the analysis engine may produce a respective classification of the input using each of the stored intermediate anomaly detection models to determine whether receipt of the input would have resulted in a classification as an anomaly at various times in the past. In this case, the input may be evaluated using a respective anomaly determination function of each of the anomaly detection models that returns a classification score. The analysis engine may classify the input as representing an object or event that should be classified as an anomaly when the classification score returned for the input exceeds a predetermined threshold associated with the anomaly detection model that was applied by the analysis engine.

At 312, method 300 includes determining, by the anomaly detection system dependent on the respective classification results, that it is likely that the anomaly detection system has been deliberately re-trained to falsely classify the input as representing an object or event that should not be classified as an anomaly. For example, the analysis engine may determine that the pattern or trend of the classification results for the input is inconsistent with expected patterns or trends associated with natural machine learning by the analysis engine based on valid inputs or is otherwise suspicious. Various techniques for determining whether it is likely that the anomaly detection system has been deliberately and maliciously re-trained to falsely classify the input as representing an object or event that should not be classified as an anomaly are described below in reference to the example method for auditing an anomaly detection system illustrated in FIG. 5.

At 314, the method includes, in response to determining that it is likely that the anomaly detection system has been deliberately re-trained, initiating, by the anomaly detection system, an action to correctly classify the input as representing an object or event that should be classified as an anomaly. For example, in various embodiments, taking corrective action may include at least one of outputting a notification of a potentially malicious re-training of the anomaly detection system, triggering an alert indicating that the input represents an object or event that is classified as an anomaly, modifying a parameter of the analysis engine, and modifying a parameter of the first anomaly detection model to generate a third anomaly detection model to be used by the analysis engine at a future point in time. The third anomaly detection model may, due to modifications made in response to the detection of a malicious re-training of the anomaly detection system, be less susceptible to malicious re-training than the first anomaly detection model. In some embodiments, the analysis engine may be modified to make it less susceptible to malicious re-training instead of, or in addition to, modifying the anomaly detection model. For example, if an analysis of the malicious re-training event uncovers a security flaw that can be exploited by malicious offenders, modifications may be made in the analysis engine or the anomaly detection model to correct the security flaw or to detect attempts to exploit the security flaw before they cause the analysis engine to ignore inputs representing an object or event that should be classified as an anomaly.

Figure 5:
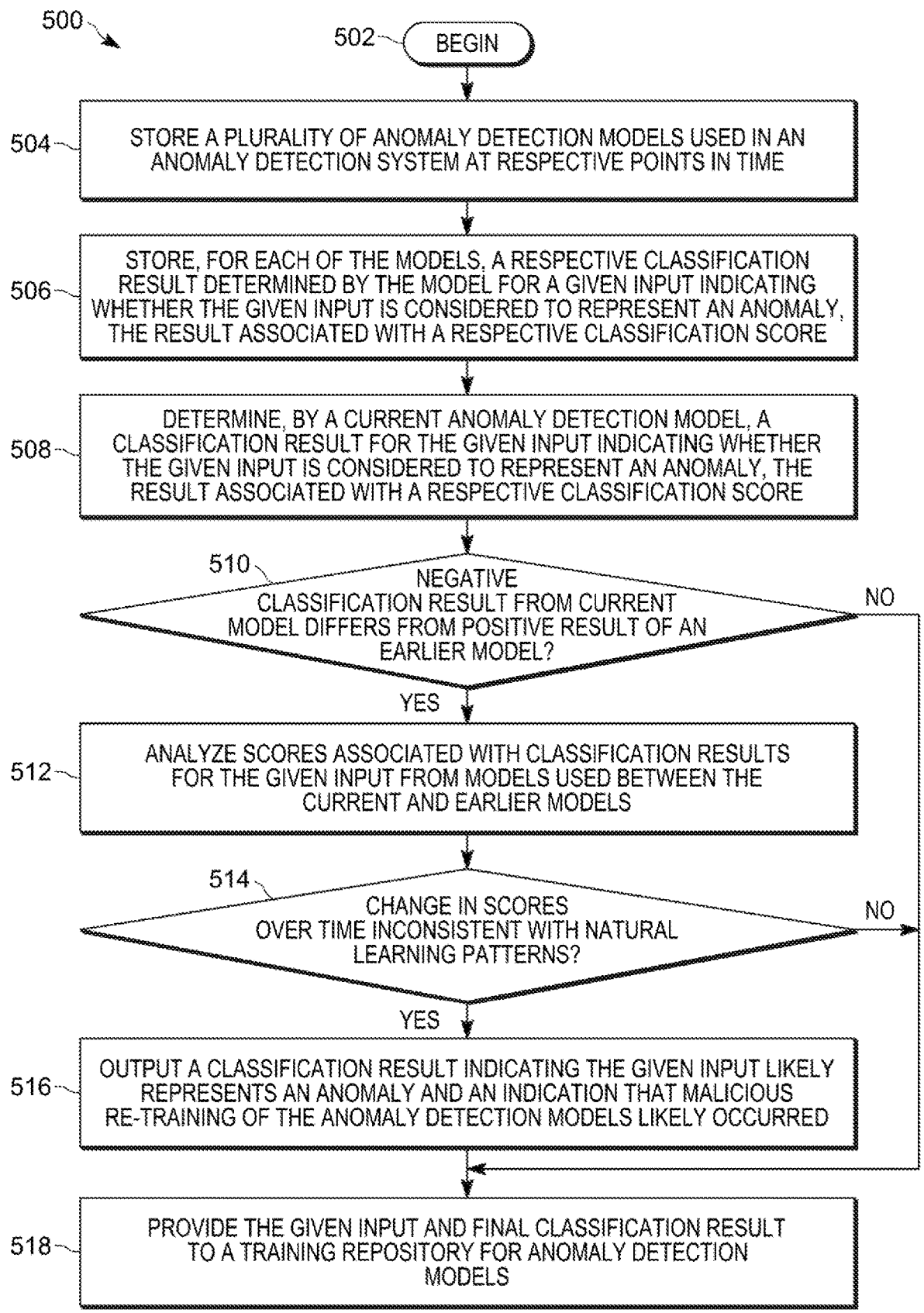
FIG. 5 is a flowchart illustrating selected elements of an example method for auditing an anomaly detection system, in accordance with some embodiments.

At least some of the operations shown in FIG. 3 and described above may be repeated during operation of the anomaly detection system in response to receiving additional inputs from the same monitoring device or different monitoring devices in a single security domain or in multiple security domains. For example, in some embodiments, machine-learning-based analysis engine 110 may make classification decisions for inputs received in one security domain based on previous classification results produced in response to inputs received in a security domain associated with a different customer, installation, facility, or portion of a facility. At least some of the operations shown in FIG. 3 may be performed during an audit of the anomaly detection system, as illustrated in FIG. 5 and described below. In some embodiments, machine-learning-based analysis engine 110 may make classification decisions based on previous classification results produced by anomaly detection models used by different clients managed by a single anomaly detection system including, in some cases, anomaly detection models used by different tenants in a multitenant anomaly detection system.

Figure 4:
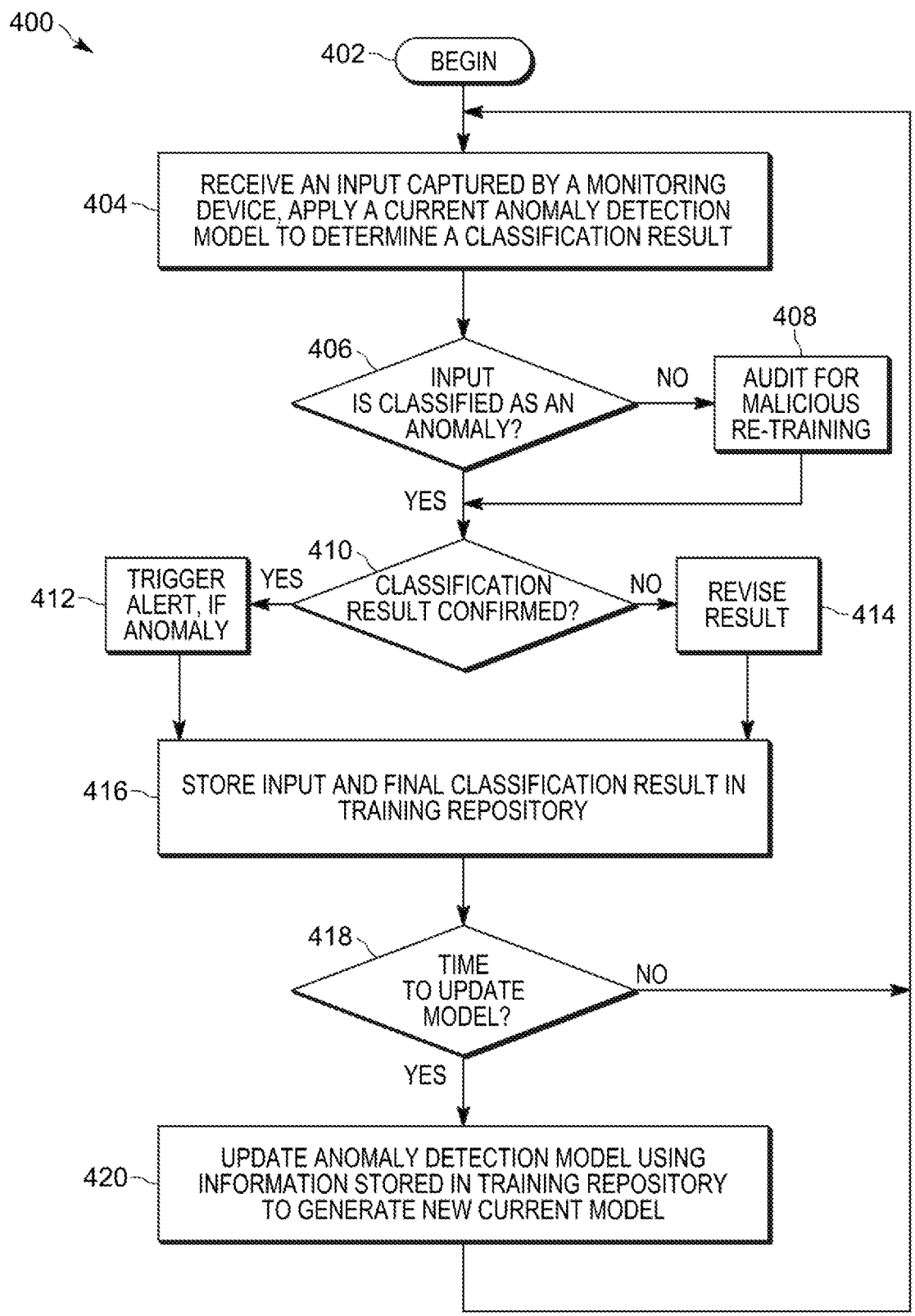
FIG. 4 is a flowchart illustrating selected elements of an example method for determining whether an input represents an anomaly, in accordance with some embodiments.

FIG. 4 is a flowchart illustrating selected elements of an example method 400 for determining whether an input represents an anomaly, in accordance with some embodiments. In at least some embodiments, some or all of the operations shown in FIG. 4 may be performed by machine-learning-based analysis engine, such as machine-learning-based analysis engine 110 illustrated in FIG. 2. In at least some embodiments, the machine-learning-based analysis engine 110 may include a processor and a memory storing instructions that when executed by the processor cause the processor to perform any of the operations illustrated in FIG. 4. In other embodiments, the machine-learning-based analysis engine 110 may include a hardware state machine or other electronic circuitry configured to perform one or more of the operations illustrated in FIG. 4. While a particular order of operations is indicated in FIG. 4 for illustrative purposes, the timing and ordering of such operations may vary where appropriate without negating the purpose and advantages of the examples set forth in detail throughout the remainder of this disclosure.

In this example embodiment, method 400 begins at block 402 in FIG. 4 and continues at block 404 with receiving an input captured by a monitoring device and applying, by a machine-learning-based analysis engine such as machine-learning-based analysis engine 110 illustrated in FIG. 2, a current anomaly detection model to determine a classification result. For example, the input may be evaluated using an anomaly determination function that returns a score and the analysis engine may classify the input as representing an object or event that should be classified as an anomaly when the score returned for the input exceeds a predetermined threshold associated with the current anomaly detection model.

If, at 406, the input is not classified as an anomaly, the method includes auditing the anomaly detection system to determine if there has been a malicious re-training of the machine-learning-based analysis engine, as in 408. An example method for auditing the anomaly detection system is illustrated in FIG. 5 and described below. On the other hand, if the input is classified as an anomaly, the method proceeds to 410. For example, if the classification result produced using the current anomaly detection model indicates that the input does not represent an object or event that should be classified as an anomaly, the method proceeds to 410.

If, at 410, the classification result is confirmed, whether automatically by the analysis engine, in response to human input, or through the audit process performed at 408, method 400 may continue at 412. Otherwise, method 400 may proceed to 414. For example, the analysis engine may access historical public safety incident information to may determine whether, at any time in the past, the received input was associated with a public safety incident. If the received input was, at some time in the past, associated with a public safety incident and the classification result indicates that the received input is an anomaly, the analysis engine may confirm the classification result. Conversely, if there is no evidence that the received input has ever been associated with a public safety incident and the classification result indicates that the received input is not an anomaly, the analysis engine may confirm the classification result. However, if the classification result is not consistent with the historical public safety incident information, the analysis engine may fail to confirm the classification result.

In another example, the analysis engine may rely on human input to determine a classification result is likely to be valid, such as when the analysis engine implements supervised machine learning. If the classification result indicates that the received input is an anomaly, and there is some evidence that the received input may be associated with a public safety incident in progress, a person at the location of the monitoring device from which the input was received or an administrator of the anomaly detection system may confirm the classification result by confirming that an alert should be triggered. Conversely, if the classification result indicates that the received input is not an anomaly, and there is no evidence that it is associated with a public safety incident, a person at the location of the monitoring device from which the input was received or an administrator of the anomaly detection system may confirm the classification result by confirming that an alert should not be triggered. However, if the classification result is not consistent with evidence of a public safety incident, or a lack thereof, a person at the location of the monitoring device from which the input was received or an administrator of the anomaly detection system may decline to confirm the classification result. In yet another example, if a result of the audit process at 408 is a determination that it is likely that there has been a malicious re-training of the machine-learning-based analysis engine, the analysis engine may fail to confirm the classification result.

At 412, method 400 includes triggering an alert, if the input has been classified and confirmed as an anomaly. At 414, the method includes revising the classification result in response to detecting a malicious re-training of the anomaly detection system or another failure to confirm the classification result produced by the current anomaly detection model. In either case, at 416, the method includes storing the input and the final classification result in a training repository the analysis engine. For example, in some embodiments, the input, the initial classification result, and the final classification result may be stored in a training repository for the analysis engine along with the current anomaly detection model.

At 418, if it is time to update the anomaly detection model for any of a number of reasons, method 400 proceeds to 420. Otherwise the method returns to 404. For example, changes may be made to the anomaly detection model according to the particular machine learning approach employed by the analysis engine in response to confirming or failing to confirm certain classification results.

At 420, method 400 includes updating the anomaly detection model using information stored in training repository to generate new current model. For example, the anomaly detection model may, due to modifications made in response to the detection of a malicious re-training of the anomaly detection system, be less susceptible to malicious re-training than the current anomaly detection model. In some embodiments, the analysis engine may be modified to make it less susceptible to malicious re-training instead of, or in addition to, modifying the anomaly detection model.

FIG. 5 is a flowchart illustrating selected elements of an example method 500 for auditing an anomaly detection system, in accordance with some embodiments. In at least some embodiments, some or all of the operations shown in FIG. 5 may be performed by machine-learning-based analysis engine, such as machine-learning-based analysis engine 110 illustrated in FIG. 2. In at least some embodiments, the machine-learning-based analysis engine 110 may include a processor and a memory storing instructions that when executed by the processor cause the processor to perform any of the operations illustrated in FIG. 5. In other embodiments, the machine-learning-based analysis engine 110 may include a hardware state machine or other electronic circuitry configured to perform one or more of the operations illustrated in FIG. 5. While a particular order of operations is indicated in FIG. 5 for illustrative purposes, the timing and ordering of such operations may vary where appropriate without negating the purpose and advantages of the examples set forth in detail throughout the remainder of this disclosure.

In this example embodiment, method 500 begins with block 502 in FIG. 5 and continues with block 504 with storing a plurality of anomaly detection models used in an anomaly detection system at respective points in time. For example, in various embodiments, snapshots of the anomaly detection models used by the analysis engine over time may be taken and stored in a training repository at predetermined or configurable intervals or when the number or significance of changes made to the anomaly detection model through machine learning, whether malicious or not, trigger a snapshot.

At 506, the method includes storing, for each of the anomaly detection models, a respective classification result determined by the anomaly detection model for a given input indicating whether the given input is considered to represent an anomaly, where the classification result is associated with a respective classification score, as described herein. In some embodiments, a particular anomaly detection model may be configured to classify received inputs of a given type, such as audio inputs, video inputs, or log data or other types of textual inputs that are received from particular types of electrical, mechanical, or environmental sensors. In other embodiments, an anomaly detection model may be configured to classify inputs captured by one or more types of monitoring devices, such as audio capture devices, image capture devices, or video capture devices of an intrusion detection system, a private security monitoring system, or a public safety monitoring system, or electrical, mechanical, or environmental sensors, such as a movement sensor, an intelligent lock, or another Internet-of-Things device, or other measuring devices that capture the state of the environment in which they are deployed, or the state of a computing device, such as a server, or a network.

At 508, method 500 includes determining, by a current anomaly detection model, a classification result for the given input indicating whether the given input is considered to represent an anomaly, where the classification result is associated with a respective classification score, as described herein. For example, determining that the given input represents an object or event that should not be classified as an anomaly may include determining that an assigned point value is less than a threshold point value for classifying the given input as representing an object or event that should be classified as an anomaly and determining that the given input represents an object or event that should be classified as an anomaly may include determining that an assigned point value is greater than or equal to a threshold point value for classifying the given input as representing an object or event that should be classified as an anomaly.

If, at 510, it is determined that a negative classification result produced by the analysis engine using the current anomaly detection model differs from positive result produced by the analysis engine using an earlier anomaly detection model, the method continues at 512. Otherwise, the method proceeds to 518. The point in time associated with the earlier anomaly detection model may correspond to a predetermined time interval prior to the application of the current anomaly detection model to the given input. In various embodiments, the predetermined time interval may be a default or configurable time interval based on the context in which the anomaly detection system is deployed, the nature or severity of the object or event represented by the input, the potential impact of a false negative classification, or other criteria.

At 512, method 500 includes analyzing classification scores associated with classification results for the given input produced by the analysis engine using intermediate anomaly detection models that were employed by the analysis engine between a point in time at which the current anomaly detection model was employed by the analysis engine and a point in time at which the earlier anomaly detection model was employed by the analysis engine. In some embodiments, classification scores associated with classification results for the given input produced by the analysis engine based on inputs received from monitoring devices in a security domain other than the security domain in which the monitoring device from which the given input was received resides may be analyzed in addition to classification scores associated with classification results for the given input produced by the analysis engine based on inputs received from monitoring devices in the same security domain as the monitoring device from which the given input was received. In some embodiments, classification scores associated with classification results for the given input produced by a second analysis engine in a security domain other than the security domain in which the analysis engine performing the analysis resides may be analyzed in addition to classification scores associated with classification results for the given input produced by the analysis engine based on inputs received from the same monitoring device or from other monitoring devices in the same security domain as the monitoring device from which the given input was received. In some embodiments, classification scores associated with classification results for the given input produced by an analysis engine associated with a tenant in a multitenant anomaly detection system other than the tenant associated with the analysis engine performing the analysis may be analyzed in addition to classification scores associated with classification results for the given input produced by the analysis engine performing the analysis.

If, at 514, it is determined that the change in classification scores over time is inconsistent with natural learning patterns, the method continues at 516. For example, determining that it is likely that the anomaly detection system has been deliberately re-trained to falsely classify the input as representing an object or event that should not be classified as an anomaly may include detecting a pattern of point values or a trend in point values assigned to the given input based on each of the anomaly detection models that increases monotonically or strictly linearly rather than somewhat randomly, as might be more typical for changes based on natural machine learning in response to valid inputs. In another example, determining that it is likely that the anomaly detection system has been deliberately re-trained to falsely classify the input as representing an object or event that should not be classified as an anomaly may include detecting a pattern of point values or a trend in point values assigned to the given input based on each of the anomaly detection models that increases much more rapidly than would typically be the case for changes based on natural machine learning in response to valid inputs.

If, however, it is determined at 514 that the change in classification scores over time is indicative of a valid application of machine learning and not a malicious re-training of the anomaly detection system, the method proceeds to 518.

At 516, method 500 includes outputting a classification result indicating that the given input likely represents an anomaly, which may trigger an alert, and outputting an indication that malicious re-training of the anomaly detection models has likely occurred, which may trigger a further analysis of the malicious re-training event. For example, a notification may be provided to an owner of a facility, space, server, or network being protected using the anomaly detection system or to an operator or administrator of the anomaly detection system or any components thereof, such as any or all of the analysis engine, training repository, or monitoring devices. As described herein, modifications may be made to the anomaly detection model or to the analysis engine in response to the detection of a malicious re-training of the anomaly detection system may improve the accuracy of the anomaly detection system and may make the anomaly detection system less susceptible to malicious re-training.

At 518, the method includes providing the given input and the final classification result, which may represent the initial classification result produced by the analysis engine using the current anomaly detection model at 508 or may represent the classification result output at 516 in response to a determination that malicious re-training has taken place, to the training repository.

In various embodiments, some or all of the operations shown in FIG. 5 may be repeated for each input received by the analysis engine of an anomaly detection system from one or more monitoring devices in a single security domain or in multiple security domains or from monitoring devices associated with one or more tenants in a multitenant anomaly detection system. In various embodiments, some or all of the operations shown in FIG. 5 may be repeated for inputs of each of multiple input types, which may be evaluated using respective anomaly detection models specific to the input type.

In some embodiments, the process for auditing an anomaly detection system shown in FIG. 5 may be performed in real time as inputs are received and classification results are determined. In other embodiments, the process for auditing an anomaly detection system shown in FIG. 5 may be performed periodically or continuously as a post-process operating independently from the classification of received inputs. In various embodiments, one or both of the classification process and the auditing process described herein may be performed automatically and without human intervention.

In various embodiments, the methods and apparatus described herein may provide technical advantages over existing anomaly detection systems in that they may detect malicious re-training of an anomaly detection system, resulting in more accurate classifications of inputs as representing, or not representing, anomalies that should trigger alerts. Snapshots of the anomaly detection models used by a machine-learning-based analysis engine of an anomaly detection system over time, along with initial and final classification results produced by those models and results of anomaly detection process audits such as those described herein, may be stored in a training repository for the analysis engine and may be further analyzed to determine modifications to the anomaly detection system likely to make it less susceptible to malicious re-training in the future.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method for detecting malicious re-training of an anomaly detection system, comprising:

receiving, by a machine-learning-based analysis engine of the anomaly detection system, an input captured by a monitoring device;

determining, by the analysis engine and based on a first anomaly detection model used by the analysis engine at a current point in time, that the input represents an object or event that should not be classified as an anomaly;

determining, by the analysis engine and based on a second anomaly detection model used by the analysis engine at a predetermined previous point in time, that the input represents an object or event previously classified as an anomaly; and in response to determining that the input represents an object or event previously classified as an anomaly:

determining, by the analysis engine, a respective classification result for the input based on each of one or more additional anomaly detection models used by the analysis engine at respective points in time between the current point in time and the predetermined previous point in time;

determining, by the analysis engine and dependent on the respective classification results, that it is likely that the anomaly detection system has been deliberately re-trained to falsely classify the input as representing an object or event that should not be classified as an anomaly; and in response to determining that it is likely that the anomaly detection system has been deliberately re-trained to falsely classify the input as representing an object or event that should not be classified as an anomaly, initiating, by the analysis engine, an action to correctly classify the input as representing an object or event that should be classified as an anomaly.

2. The method of claim 1, wherein the input includes audio data or video data captured by a monitoring device of an intrusion detection system, a private security monitoring system, or a public safety monitoring system.

3. The method of claim 1, wherein:
the method further comprises storing, prior to receiving the input:
  the first anomaly detection model;
  the second anomaly detection model;
  the one or more additional anomaly detection models; and
  classification results including a classification result for the input based on the second anomaly detection model and the respective classification result for the input based on each of the one or more additional anomaly detection models; and
determining the respective classification result for the input based on each of one or more additional anomaly detection models includes accessing the stored classification results.

4. The method of claim 1, wherein taking corrective action includes at least one of:
outputting a notification of a potentially malicious re-training of the anomaly detection system;
triggering an alert indicating that the input represents an object or event that is classified as an anomaly;
modifying a parameter of the analysis engine; and
modifying a parameter of the first anomaly detection model to generate a third anomaly detection model to be used by the analysis engine at a future point in time.

5. The method of claim 1, wherein the one or more additional anomaly detection models represent respective snapshots of anomaly detection models used by the analysis engine taken between the current point in time and the predetermined previous point in time, each snapshot being taken at a predetermined time interval or in response to a change in the anomaly detection model used by the analysis engine based on machine learning.

6. The method of claim 1, wherein:
the method further comprises assigning, by the analysis engine, a point value to the input indicative of the likelihood that the input represents an object or event that should be classified as an anomaly, the point value being dependent on which anomaly detection model is used by the analysis engine;
determining that the input represents an object or event that should not be classified as an anomaly includes determining that an assigned point value is less than a threshold point value for classifying the input as representing an object or event that should be classified as an anomaly;
determining that the input represents an object or event that should be classified as an anomaly includes determining that an assigned point value is greater than or equal to a threshold point value for classifying the input as representing an object or event that should be classified as an anomaly; and
determining that it is likely that the anomaly detection system has been deliberately re-trained to falsely classify the input as representing an object or event that should not be classified as an anomaly includes detecting a pattern of point values or a trend in point values assigned to the input based on each of the one or more additional anomaly detection models that is inconsistent with expected patterns or trends associated with machine learning by the analysis engine.

7. The method of claim 1, wherein determining that it is likely that the anomaly detection system has been deliberately re-trained to falsely classify the input as representing an object or event that should not be classified as an anomaly includes determining a respective classification result for the input based on each of one or more anomaly detection models used by an analysis engine of another anomaly detection system at respective points in time.

8. The method of claim 1, wherein the object or event is associated with a public safety incident.

9. A machine-learning-based analysis engine of an anomaly detection system, comprising:
a processor; and
a memory storing program instructions that when executed by the processor cause the processor to perform:
  receiving an input captured by a monitoring device;
  determining, based on a first anomaly detection model used by the analysis engine at a current point in time, that the input represents an object or event that should not be classified as an anomaly;
  determining, based on a second anomaly detection model used by the analysis engine at a predetermined previous point in time, that the input represents an object or event previously classified as an anomaly; and
  in response to determining that the input represents an object or event previously classified as an anomaly:
    determining a respective classification result for the input based on each of one or more additional anomaly detection models used by the analysis engine at respective points in time between the current point in time and the predetermined previous point in time;

determining, dependent on the respective classification results, that it is likely that the anomaly detection system has been deliberately re-trained to falsely classify the input as representing an object or event that should not be classified as an anomaly; and in response to determining that it is likely that the anomaly detection system has been deliberately re-trained to falsely classify the input as representing an object or event that should not be classified as an anomaly, initiating an action to correctly classify the input as representing an object or event that should be classified as an anomaly.

10. The machine-learning-based analysis engine of claim 9, wherein the input includes audio data or video data captured by a monitoring device of an intrusion detection system, a private security monitoring system, or a public safety monitoring system.

11. The machine-learning-based analysis engine of claim 9, wherein:

when executed by the processor, the program instructions further cause the processor to perform storing, prior to receiving the input:
the first anomaly detection model;
the second anomaly detection model;
the one or more additional anomaly detection models; and
classification results including a classification result for the input based on the second anomaly detection model and the respective classification result for the input based on each of the one or more additional anomaly detection models; and determining the respective classification result for the input based on each of one or more additional anomaly detection models includes accessing the stored classification results.

12. The machine-learning-based analysis engine of claim 9, wherein determining that it is likely that the anomaly detection system has been deliberately re-trained to falsely classify the input as representing an object or event that should not be classified as an anomaly includes determining a respective classification result for the input based on each of one or more anomaly detection models used by an analysis engine of another anomaly detection system at respective points in time.

13. The machine-learning-based analysis engine of claim 9, wherein taking corrective action includes at least one of:
outputting a notification of a potentially malicious re-training of the anomaly detection system;
triggering an alert indicating that the input represents an object or event that is classified as an anomaly;
modifying a parameter of the analysis engine; and
modifying a parameter of the first anomaly detection model to generate a third anomaly detection model to be used by the analysis engine at a future point in time.

14. The machine-learning-based analysis engine of claim 9, wherein:

when executed by the processor, the program instructions further cause the processor to perform assigning a point value to the input indicative of the likelihood that the input represents an object or event that should be classified as an anomaly, the point value being dependent on which anomaly detection model is used by the analysis engine;

determining that the input represents an object or event that should not be classified as an anomaly includes determining that an assigned point value is less than a threshold point value for classifying the input as representing an object or event that should be classified as an anomaly;

determining that the input represents an object or event that should be classified as an anomaly includes determining that an assigned point value is greater than or equal to a threshold point value for classifying the input as representing an object or event that should be classified as an anomaly; and determining that it is likely that the anomaly detection system has been deliberately re-trained to falsely classify the input as representing an object or event that should not be classified as an anomaly includes detecting a pattern of point values or a trend in point values assigned to the input based on each of the one or more additional anomaly detection models that is inconsistent with expected patterns or trends associated with machine learning by the analysis engine.

15. An anomaly detection system, comprising:
a first monitoring device;
a repository storing a plurality of anomaly detection models; and
a machine-learning-based analysis engine, comprising:
an interface through which the machine-learning-based analysis engine receives inputs from the first monitoring device;
a processor; and
a memory storing program instructions that when executed by the processor cause the processor to perform:
receiving, via the interface, a first input captured by the first monitoring device;
determining, based on a first anomaly detection model of the plurality of anomaly detection models, that the first input represents an object or event that should not be classified as an anomaly, the first anomaly detection model being used by the analysis engine at a current point in time;
determining, based on a second anomaly detection model of the plurality of anomaly detection models, that the first input represents an object or event previously classified as an anomaly, the second anomaly detection model having been used by the analysis engine at a predetermined previous point in time; and
in response to determining that the first input represents an object or event previously classified as an anomaly:
determining a respective classification result for the first input based on each of one or more additional anomaly detection models of the plurality of anomaly detection models, the one or more additional models having been used by the analysis engine at respective points in time between the current point in time and the predetermined previous point in time;
determining, dependent on the respective classification results, that it is likely that the anomaly detection system has been deliberately re-trained to falsely classify the first input as representing an object or event that should not be classified as an anomaly; and in response to determining that it is likely that the anomaly detection system has been deliberately re-trained to falsely classify the first input as representing an object or event that should not be classified as an anomaly, initiating an action to correctly classify the first input as representing an object or event that should be classified as an anomaly.

16. The anomaly detection system of claim 15, wherein the first monitoring device comprises an audio capture device, an image capture device, or a video capture device of an intrusion detection system, a private security monitoring system, or a public safety monitoring system.

17. The anomaly detection system of claim 15, wherein:
the repository further stores classification results including a classification result for the first input based on the second anomaly detection model and the respective classification result for the first input based on each of the one or more additional anomaly detection models; and determining the respective classification result for the first input based on each of one or more additional anomaly detection models includes accessing the stored classification results.

18. The anomaly detection system of claim 15, wherein taking corrective action includes at least one of:
outputting a notification of a potentially malicious re-training of the anomaly detection system;
triggering an alert indicating that the first input represents an object or event that is classified as an anomaly;
modifying a parameter of the analysis engine; and
modifying a parameter of the first anomaly detection model to generate a third anomaly detection model to be used by the analysis engine at a future point in time.

19. The anomaly detection system of claim 15, wherein:
when executed by the processor, the program instructions further cause the processor to perform assigning a point value to the first input indicative of the likelihood that the first input represents an object or event that should be classified as an anomaly, the point value being dependent on which anomaly detection model is used by the analysis engine;

determining that the first input represents an object or event that should not be classified as an anomaly includes determining that an assigned point value is less than a threshold point value for classifying the first input as representing an object or event that should be classified as an anomaly;

determining that the first input represents an object or event that should be classified as an anomaly includes determining that an assigned point value is greater than or equal to a threshold point value for classifying the first input as representing an object or event that should be classified as an anomaly; and determining that it is likely that the anomaly detection system has been deliberately re-trained to falsely classify the first input as representing an object or event that should not be classified as an anomaly includes detecting a pattern of point values or a trend in point values assigned to the first input based on each of the one or more additional anomaly detection models that is inconsistent with expected patterns or trends associated with machine learning by the analysis engine.

20. The anomaly detection system of claim 15, further comprising:
a second monitoring device residing in a security domain other than a security domain in which the first monitoring device resides;
wherein determining that it is likely that the anomaly detection system has been deliberately re-trained to falsely classify the first input as representing an object or event that should not be classified as an anomaly includes determining a respective classification result for a second input captured by the second monitoring device based on each of one or more anomaly detection models used by the analysis engine at respective points in time.

* * * * *